United States Patent Office 3,211,801
Patented Oct. 12, 1965

3,211,801
SUPPORTED OLEFIN CONVERSION CATALYSTS
Vernon C. F. Holm and Delma M. Blackburn, both of Bartlesville, Okla., assignors to Phillips Petroleum Company, a corporation of Delaware
No Drawing. Filed Dec. 8, 1961, Ser. No. 158,127
9 Claims. (Cl. 260—683.2)

This invention relates to a novel method of preparing a supported aluminum phosphate catalyst, to the novel catalyst prepared by this method, and to the catalytic conversion of hydrocarbons such as isomerization or polymerization with the novel catalyst.

In the prior art, it has been reported that dry butene-1 can be isomerized over aluminum phosphate. Aluminum phosphate is a medium-priced chemical, but would be expensive compared to other catalytic materials if commercial beds of the technically pure grades of the material were utilized. The material also has a tendency to reduce to fines in the fixed bed processes. Trays of the material dispersed on porous supporting materials have been utilized, but these materials such as kieselguhr, diatomaceous earth, clays, bauxite, and the like do not respond well to attrition induced by fast flows utilized by industrial plants in order to provide suitable yields per volume of catalyst per unit of time. In other words, the supported catalyst suffers considerable attrition and crumbling so as to cause bed plugging and poor contact of the feed with the catalyst. This requires shutting down the process and substituting new catalyst for the partially disintegrated catalyst and results in much higher production costs than can be obtained by a high attrition resistant catalyst bed.

Accordingly, it is an object of the invention to provide a supported aluminum phosphate catalyst which is highly attrition resistant. Another object is to provide a catalyst which may be molded into any desired form suitable for forming a relatively non-plugging, attrition-resistant, active catalyst bed. It is also an object to provide an improved process for converting light hydrocarbons to heavier hydrocarbons. A further object is to provide an improved process for the isomerization of hydrocarbons wherein the volume of hydrocarbon isomerized per unit volume of catalyst per unit of time is substantially increased over processes using prior art catalysts of aluminum phosphate. Other objects of the invention will become apparent to one skilled in the art upon consideration of the accompanying disclosure.

A broad aspect of the invention comprises preparing a supported aluminum phosphate catalyst by forming a dilute aqueous alkaline solution of an alkali metal silicate, an alkali metal aluminate, and phosphoric acid, adjusting the pH of said solution so as to precipitate a porous silica gel containing aluminum phosphate; washing said gel to remove alkali metal salt; drying said gel; comminuting the dried gel; compressing the comminuted gel at elevated pressure into small bodies of suitable shape for catalytic processes; and calcining said bodies at a temperature in the range of 250 to 800° C. for 3 to 6, preferably 4, hours to form hard, attrition-resistant catalyst bodies. The resulting catalyst comprises hard, attrition-resistant, porous bodies of coprecipitated silica and aluminum phosphate gel particles compressed into said body. The concentration of aluminum phosphate is controlled within the range of about 1 to 25 weight percent of the catalyst body.

One specific method of forming the catalyst comprises precipitating aluminum phosphate under basic conditions within a silica gel network by mixing solutions of alkali metal aluminate and alkali metal silicate with dilute phosphoric acid to form a basic solution, adjusting the pH of the mixture to the range of 7 to 10 so as to form a gel, washing the gel to remove soluble salts, drying the washed gel, powdering the dry material, molding the powder at a temperature in the range of 50 to 150° C., preferably 100° C., and 35,000 p.s.i. into forms suitable for use in catalyst beds in commercial processes, and calcining the molded forms at a temperature in the range of 450 to 650° C. in air for about 3 to 6 hours.

The preferred alkali metal is sodium, sodium silicate and sodium aluminate being the preferred starting compounds. However, the corresponding potassium, lithium, cesium, and rubidium compounds may be utilized, but are not the full equivalents. The pH may be varied within the range of 7 to 10, the essential requirement being the precipitation of a silica gel network containing the precipitated aluminum phosphate. The shaped catalyst may be prepared by molding, extrusion, or tableting under high pressure in the range of about 10,000 to 45,000 p.s.i. Compressing the particulate gel into shapes at an elevated temperature in the range of about 20 to 150° C. is preferred. While it is preferred to calcine the catalyst forms at a temperature in the range of 450 to 650° C., they may be calcined at a temperature in the range of 250 to 800° C. with good results.

The removal of the soluble alkali metal salt from the gel is essential to proper catalyst function and may be carried out by any conventional means such as, for example, water washing. Another convenient means is to wash the gel with an aqueous solution of a volatile salt such as ammonium chloride. Thus, in addition to the rinsing action of the water, the alkali metal also tends to be removed by its replacement in the gel with a volatile ammonium salt by means of base exchange. Moreover, it is sometimes convenient to only partially purify the gel before drying and to complete the purification by rewashing the dried and powdered gel followed by a second drying. The dry powdered gel is formed into any of the conventional shapes suitable for commercial fixed bed catalytic processes. These include rods or cylinders, tablets, pills, etc. Forms which pack into beds of high permeability facilitating high hydrocarbon thru-put are desirable.

In order to describe a specific application of the procedure of this invention to preparation of the novel catalyst and to show the high degree of catalytic activity attained, the material will be utilized in the isomerization of butene-1 to butene-2. This should not limit the scope of the invention to the $C_4$-olefins, because, equally superior results are obtained when the catalysts are utilized for the isomerization of olefins of higher molecular weight, where it is desired to move the double bond to a new position in the hydrocarbon chain. The limitation on the catalyst is imposed by the equilibrium concentrations thermodynamically possible at the temperature of reaction. Thus at low temperatures butene-2 formation is favored whereas at higher temperatures butene-1 is favored. In general for the heavier olefins, the terminal double bond is the favored specie at high temperatures and shifting the bond to more internal positions required milder conditions for favorable yields.

EXAMPLE I

Two solutions were prepared and mixed in order to prepare the catalyst of this invention:

Solution 1—The ingredients and amounts given below were added to 900-ml. of distilled water.

|  | Grams |
|---|---|
| Sodium aluminate | 2.31 |
| Sodium silicate (28.7 wt. perecnt $SiO_2$) | 199.0 |
| Sodium hydroxide | 0.6 |

Solution 2—Sixteen and six-tenths ml. of 85 wt. percent phosphoric acid was added to 900-ml. of distilled water.

Solution 1 was added to solution 2 with efficient stirring. The pH of the resulting solution was then adjusted to 9.3 by adding more phosphoric acid. On standing approximately 30 minutes the mixture set to a firm, clear gel. About one hour after gelling, the gel was transferred to a Büchner filter and drained overnight. The drained gel was placed in a finely woven cloth bag and further purified by a base exchange process to remove the nonvolatile, soluble salts. The washing solution was about 1 liter of an aqueous solution of 5% ammonium chloride. The bag was alternately immersed in the solution for 10 minutes and elevated to drain for 5 minutes. The treatment was continued for 2 hours. The washed gel was transferred to an open dish and dried at 110° C. The resulting material was readily reduced to a fine powder and transferred to a Büchner filter where it was washed two times with distilled water, five times with 5% aqueous ammonium chloride solution, and six times more with water. It was again dried at 110° C.

After a portion of the above dried gel was heat treated in air at 500° C. for 5 hours, an analysis showed that it contained approximately 5 weight percent aluminum phosphate in the silica gel matrix.

Another portion of the gel was molded into 1-inch disks with a thickness of approximately 0.011-inch by weighing 0.2 to 0.22 gram of the powder into a mold which was closed with a pressure of 35,000 p.s.i. after heating to 100° C. When removed from the mold, and calcined in air at 550° C. for 4 hours the material was a white, ceramic-like strong disk having structural strength far greater than silica gel alone when molded and calcined under the same conditions. In fact, it is difficult to make silica disks having good physical properties by this procedure.

The calcined catalyst disk was placed in an infra-red cell made of pyrex having a general cruciform shape. The cell was equipped with a slotted coiled heater which was utilized as the mounting for the disk. The cell was water cooled and closed at each side by calcium fluoride windows. The top and bottom of the cell were equipped for insertion into a high vacuum system equipped with gas-handling manifold and manometer. The disks were placed in a recessed end of the ceramic heater coil form, and the heater was aligned parallel to and concentric with the cross arms of the cell between the calcium fluoride windows. The temperature of the heater was raised to 550° C. and maintained at that temperature for 4 hours with air in the cell. The temperature was reduced to 400° C. and the cell was maintained at that temperature for 3 to 4 hours under cavuum ($10^{-4}$ mm. Hg). Finally, the temperature of the cell was increased to 450° C. and was maintained at that temperature for 1 hour. The cell was cooled to 35° C. for determination of the catalytic activity.

*Isomerization of Butene–1 to Butene–2*

The cell and catalyst as prepared above were placed in the path of an infrared beam, 16 mm. Hg pressure of butene–1 was admitted to the cell and the development of structure on the catalyst surface was observed by infra-red absorption. After about 40 minutes, the absorption due to increased methylene-content leveled off. After 1 hour's contact with the catalyst, a sample of the gas phase was removed for analysis. The analysis indicated that 93 percent butene–2 and 7 percent butene–1 were present in the gas phase mixture after 1 hour.

The infra-red work also indicated that a slight absorbed hydrocarbon phase developed on the catalyst surface.

The disk, on removal, had a slight pink-to-orange coloration. The strength had not been impaired.

While the above data are specific to the isomerization of butene–1, the catalyst of the invention is effective in isomerizing any isomerizable hydrocarbon and, particularly, $C_4$ to $C_{12}$ olefin hydrocarbons. The hydrocarbon to be isomerized may be in either liquid or vapor phase and it may be admixed with a liquid diluent inert in the isomerization process. Conventional temperatures in the range of 10 to 350° C. and pressure in the range of subatmospheric to 100 atmospheres may be utilized.

The catalyst of the invention is also effective in converting or reforming $C_3$ to $C_{24}$ olefins to produce other hydrocarbons. The following examples serve to illustrate this aspect of the invention.

EXAMPLE II

A 95:5 $SiO_2$-$AlPO_4$ catalyst was prepared in the manner described in Example I except that the washed and dried gel was not crushed to a powder and pressed into a disc but was merely crushed into 20–60 mesh fragments. The particulate catalyst was then activated for 5 hrs. at 500° C. in a stream of air. The catalyst exhibited a surface area of 554 m.$^2$/g. and a protonic acidity of 0.49 meq./g.

A 4.67 g. (10 ml.) quantity of this above-prepared material was used to form a catalytic bed which was enclosed in a system fitted for close temperature control, a controlled flow of propylene, and a means for withdrawing liquid products. The catalyst bed was heated at 400° C. for an additional 2 hours in nitrogen while in the test apparatus and then cooled.

Such an apparatus and procedure were used to test the catalytic activity of the catalyst for the conversion of propylene (research grade) at a space velocity of 250 volumes of propylene (at room conditions) per volume of catalyst per hour over a wide range of reaction temperatures, increasing at a constant rate, and at atmospheric pressure. The conversion of propylene at each temperature was calculated from the amount of propylene consumed. The results of the temperature conversion study are shown in Table I. For comparison purposes, a conventional 90:10 $SiO_2$-$Al_2O_3$ composition and a 5:86:9 $AlPO_4$-$SiO_2$-$Al_2O_3$ composition were also similarly tested. The data show that the 95:5 $SiO_2$-$AlPO_4$ catalyst produces higher propylene conversions throughout most of the temperature range studied.

TABLE I.—PROPYLENE CONVERSION, PERCENT

| Temp.,° C. | 95$SiO_2$-5$AlPO_4$ | 90$SiO_2$-10$Al_2O_3$ | 5$AlPO_4$-86$SiO_2$-9$Al_2O_3$ |
| --- | --- | --- | --- |
| 55 | 9 | 3 | 5 |
| 100 | 18 | 6 | 6 |
| 170 | 22 | 17 | 19 |
| 200 | 27 | 43 | 40 |
| 230 | 30 | 23 | 20 |
| 250 | 27 | 14 | 18 |
| 300 | 42 | 9 | 19 |
| 350 | 60 | 15 | 34 |
| 400 | 60 | 35 | 50 |

EXAMPLE III

In another run, the procedure of the preceding Example II was repeated except that the propylene conversion was carried out for 110 minutes at the relatively constant temperature of 104–110° C. The indicated conversion rate during this period was 5–7% and the analysis of the resulting product effluent had the hydrocarbon distribution shown in Table II.

TABLE II

| | Percent |
| --- | --- |
| $C_3$'s | 3.2 |
| $C_4$'s | Trace |
| $C_5$'s | 0.3 |
| $C_6$'s | 14.7 |
| $C_7$'s | 4.5 |
| $C_8$'s | 15.8 |
| $C_9$'s | 38.2 |
| $C_{10}$'s | 4.4 |
| $C_{11}$'s | 7.6 |
| $C_{12}$'s | 10.4 |
| $C_{13}$'s | 0.9 |
| | 100.0 |

EXAMPLE IV

In another run, which was except for reaction temperature, essentially identical to that of Example III, the propylene conversion products were collected at a conversion temperature of 340° C. The hydrocarbon product distribution from this run is shown in Table III.

TABLE III

| | Percent |
|---|---|
| $C_4$'s | 1.6 |
| $C_5$'s | 14.9 |
| $C_6$'s | 35.8 |
| $C_7$'s | 20.6 |
| $C_8$'s | 11.0 |
| $C_9$'s | 7.4 |
| $C_{10}$'s | 2.8 |
| $C_{11}$'s | 1.1 |
| $C_{12}$'s | 2.8 |
| $C_{13}$'s | 2.0 |
| | 100.0 |

Comparison of the 110° C. and 340° C. runs in Example III and Example IV, respectively, indicates that greater cracking occurs at the higher conversion temperatures which produces somewhat more lower molecular weight products.

The conversion involved in Examples II, III, and IV is a combination of reforming reactions including polymerization, disproportionation, and cracking. The temperature range for such conversion of olefins ranges from about 10 to 450° C., preferably, 100 to 400° C.

While the preceding examples demonstrate the ability of the invention catalyst to cause both double bond migration and olefin condensation, it will be appreciated that as with other acidic catalysts of this type, such as the silica-alumina type composites, several reactions can and do occur at about the same time although perhaps at somewhat different rates. Thus this catalyst, when contacted with an olefin, will promote not only double bond isomerization, but such reactions as polymerization, skeletal isomerization, and cracking as well. Depending upon the particular product desired, specific conditions are chosen which tend to maximize the reactions desired and minimize the reactions not desired. For example, double bond isomerization is generally predominant and polymerization and cracking are minimized at temperatures lower than 250° C. On the other hand at temperatures greater than 400° C., the cracking reaction increases while the polymerization and isomerization reactions decrease. Increasing the space velocity will also tend to favor double bond isomerization at lower temperatures whereas longer contact with the catalyst may favor condensation to products of increased molecular weight. The size of the initial olefin will also affect the choice of reaction conditions, the larger molecules generally being more reactive at a given temperature.

Certain modifications of the invention will become apparent to those skilled in the art and the illustrative details disclosed are not to be construed as imposing unnecessary limitations on the invention.

We claim:

1. The process of preparing rugged composite catalyst bodies containing principally silica and aluminum phosphate which comprises forming a dilute aqueous alkaline solution of an alkali metal silicate, an alkali metal aluminate, and phosphoric acid; adjusting the pH of said solution so as to precipitate a porous gel containing silica and aluminum phosphate; washing said gel to remove alkali metal salt; drying said gel; forming the dried gel into small bodies of suitable shape for catalytic processes by compressing same at an elevated pressure; and calcining said bodies at a temperature in the range of 250 to 800° C. for at least several hours to form hard, attrition-resistant catalyst bodies.

2. The process of claim 1 wherein said aluminate is sodium aluminate and said pH is adjusted to the range of about 8 to 9.5.

3. The process of claim 1 wherein the gel is comminuted and the resulting particles are molded into small bodies at an elevated temperature and at a pressure of at least 10,000 p.s.i.

4. The process of claim 1 wherein the washing step includes washing said gel with an aqueous solution of an ammonium salt.

5. The process of claim 4 wherein said ammonium salt is ammonium chloride.

6. The process of converting a feed consisting essentially of $C_3$ to $C_{24}$ olefin hydrocarbon to other hydrocarbon material which comprises contacting said hydrocarbon under conversion conditions including a temperature in the range of 10 to 450° C. with a catalyst in the form of hard, attrition-resistant, porous bodies of precipitated silica gel having aluminum phosphate incorporated in its matrix during precipation, the concentration of aluminum phosphate in said bodies being in the range of 1 to 25 weight percent, so as to convert said hydrocarbon to other hydrocarbon material.

7. The process of isomerizing a feed consisting essentially of isomerizable $C_4$ to $C_{12}$ hydrocarbon which comprises contacting said hydrocarbon under isomerizing conditions with catalyst particles in the form of hard, attrition-resistant, porous bodies of precipitated silica gel having aluminum phosphate incorporated in its matrix during precipitation, the concentration of aluminum phosphate in said bodies being in the range of 1 to 25 weight percent, so as to isomerize said hydrocarbon.

8. The process of claim 6 wherein said hydrocarbon is butene-1.

9. The process of claim 6 wherein said bodies are arranged in a fixed bed.

References Cited by the Examiner
UNITED STATES PATENTS

| 2,281,804 | 5/42 | Ruthruff | 260—683.2 |
| 2,310,161 | 2/43 | Layng | 252—437 |
| 2,997,509 | 8/61 | Wirth | 260—681 |

ALPHONSO D. SULLIVAN, *Primary Examiner.*